United States Patent [19]

Macaulay

[11] Patent Number: 4,952,851
[45] Date of Patent: Aug. 28, 1990

[54] ELECTRONIC CRT CENTERING ALIGNMENT APPARATUS

[75] Inventor: Malcolm Macaulay, Fullerton, Calif.

[73] Assignee: Hughes Aircraft Company, Los Angeles, Calif.

[21] Appl. No.: 450,199

[22] Filed: Dec. 13, 1989

[51] Int. Cl.⁵ .................. H01J 29/70; H04N 17/00
[52] U.S. Cl. .................................. 315/398; 358/139
[58] Field of Search ................ 315/398; 358/10, 139

[56] References Cited

U.S. PATENT DOCUMENTS 4,282,461  8/1981  Simon et al. .............. 315/398

*Primary Examiner*—Gregory C. Issing
*Attorney, Agent, or Firm*—Wanda K. Denson-Low

[57] ABSTRACT

An electronic CRT centering alignment apparatus is disclosed. The apparatus includes a pair of zero crossing detectors, one sensing CRT horizontal deflection current, the other sensing CRT vertical deflection current. The zero crossing detectors are employed by the apparatus to generate video signals to mark the center of deflection of the CRT and to delineate the horizontal and vertical axes of deflection.

9 Claims, 2 Drawing Sheets

ELECTRONIC CRT CENTERING ALIGNMENT APPARATUS

BACKGROUND OF THE INVENTION

The present invention relates to cathode ray tube (CRT) displays, and more particularly to an electronic system for locating the center of deflection of the CRT.

In high resolution display systems, especially in those which project and enlarge images originating on the face of a CRT, precise and accurate alignment of the CRT image center (center of deflection) and the optical axis centerline is essential for satisfactory performance. No method to assure this alignment is in use, alignment typically being based on approximate physical positioning of the CRT using a circular piece of graph paper as a tool. In light of CRT dimensions and imprecision of CRT manufacture, the present method can be quite inaccurate. If the CRT is positioned off-center, the range of deflection correction signal currents may be exceeded and projector alignment become a tedious and inexact process done by hit or miss.

The foregoing method is imprecise, relying on CRT manufacturing deflection center specifications and a questionable tool to make a fundamentally important alignment.

The MM5322 color bar generator chip marketed by National Semiconductor Corporation may be used for NTSC standard television receivers, and generates a number of output test patterns, including a single crosshair. As the chip is understood, its application is limited to a standard television receiver.

It is therefore an object of this invention to provide an apparatus suitable for accurately indicating the vertical and horizontal centers of deflection and deflection axes of any raster-scanned CRT display.

SUMMARY OF THE INVENTION

An apparatus for indicating the deflection alignment of a raster-scanned CRT display is disclosed. The apparatus includes means responsive to the CRT display horizontal deflection signal for generating a horizontal zero pulse each time a zero crossing is detected during an active scan interval of the CRT display. The apparatus further includes means responsive to the CRT display vertical deflection signal for generating a vertical zero pulse each time a zero crossing is detected during an active scan interval of the CRT display.

A video signal generator responsive to the horizontal zero pulse is proved, and generates a first CRT beam control signal in response to the horizontal zero pulse, the first CRT control signal generating a vertical line on the CRT marking the vertical deflection axis and the electrical center of horizontal deflection.

The video signal generator is further responsive to the vertical zero pulse for generating a second CRT beam control signal in response to the vertical zero pulse, the second CRT control signal generating a horizontal raster-scanned line on the CRT marking the horizontal deflection axis and the electrical center of vertical deflection.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
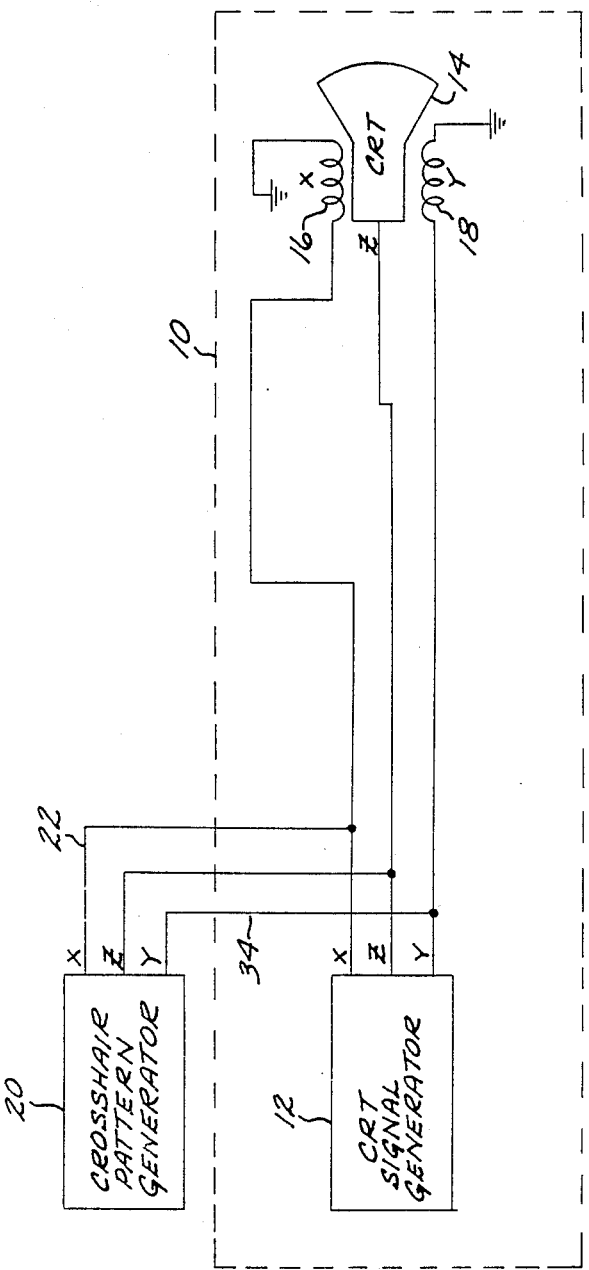
FIG. 1 is a simplified block diagram of a CRT display employing an electronic crosshair pattern generator circuit in accordance with the invention.

FIG. 1 illustrates a generalized raster-scanned CRT display device 10 which employs an electronic crosshair pattern generator 20 in accordance with the invention. The CRT display device 10 may be any type of raster-scanned CRT display, but it is presently contemplated that the present invention is particularly well suited to high resolution television displays. The device 10 includes a raster-scanned cathode ray tube (CRT) 14, a CRT signal generator 12, and the X and Y deflection yokes 16 and 18. The signal generator 12 generates the X and Y deflection coil signals to deflect the CRT election beam, and the Z or video signal to control the CRT beam intensity. Of course, as is well known, the X and Y deflection signals are periodic sawtooth signals which repeatedly drive the beam through a raster path to essentially completely cover the CRT screen area of interest.

In accordance with the invention, an electronic pattern generator circuit 20 is connected to the CRT display 10, and is responsive to the horizontal and vertical deflection signals to provide a crosshair video signal indicating the center of deflection of the CRT and to delineate the vertical and horizontal axes of deflection.

Figure 2:
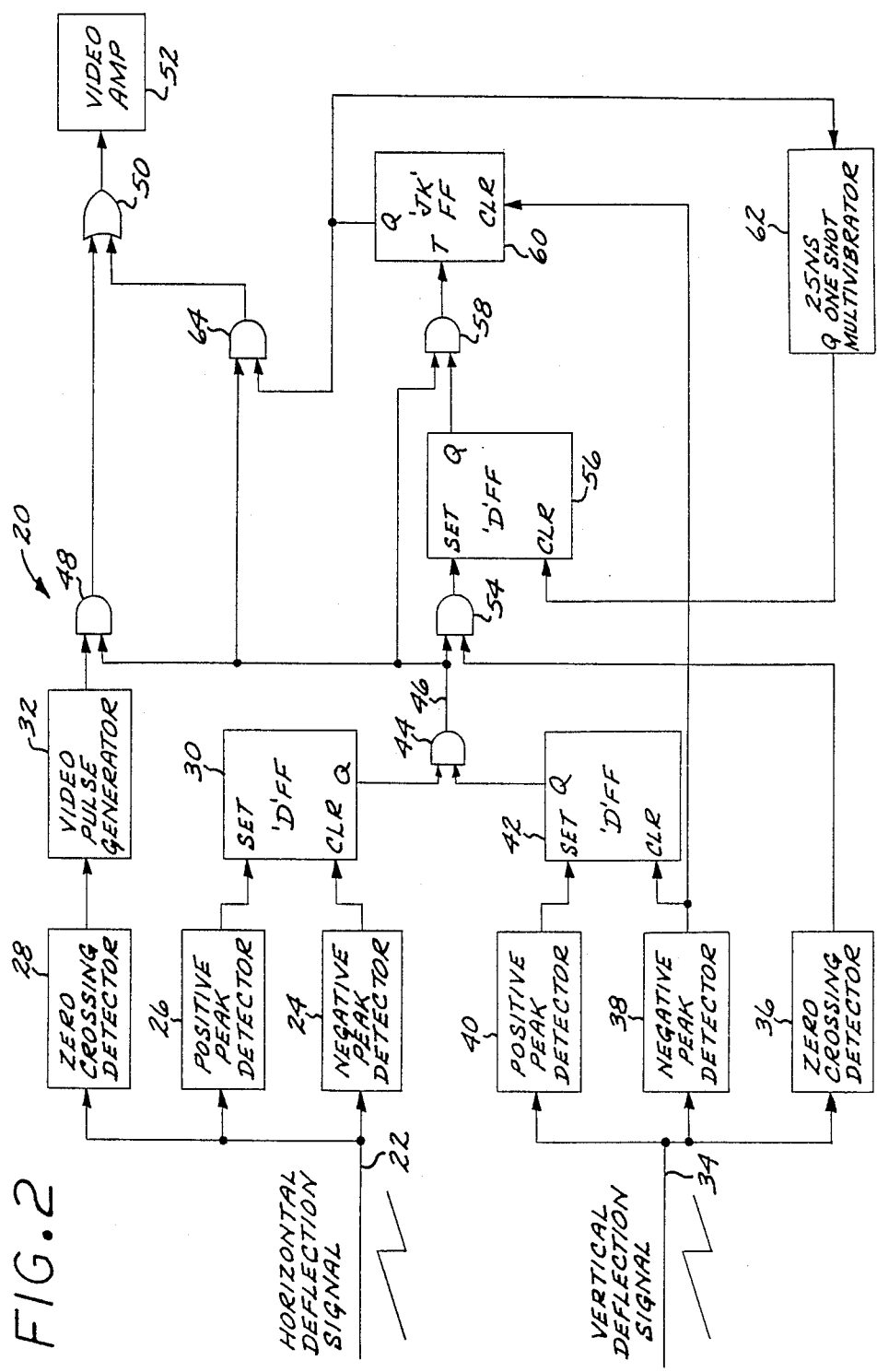
FIG. 2 is a schematic block diagram of an electronic crosshair pattern generator circuit embodying the invention.

An electronic crosshair pattern generator circuit 20 embodying the invention is shown in FIG. 2. The circuit 20 is responsive to signals 22 and 34 representative of the CRT horizontal and vertical deflection signals. Thus, the signal 22 is representative of the horizontal deflection sawtooth signal, which is proportional to the current in the CRT horizontal deflection yoke 16, and is presented to the negative peak detector 24, the positive peak detector 26, and the zero crossing detector 28. The output signal from the positive peak detector 26 sets the D flip-flop 30. The output signal from the negative peak detector 24 clears the D flip-flop 30. Thus, the output signal from the D flip-flop 30 is true only during the active horizontal scanning interval of the CRT.

The signal 34 is representative of the vertical deflection sawtooth signal, which is proportional to the current in the CRT vertical deflection yoke 18, and is presented to the zero crossing detector 36, the negative peak detector 38 and the positive peak detector 40. The output of the positive peak detector 40 sets the D flip-flop 42. The output from the negative peak detector 38 clears the D flip-flop circuit 42 and also the JK flip-flop 60. Thus, the output of the D flip-flop is active only during the active vertical scanning interval.

The Q outputs from the respective D flip-flops 30 and 42 are combined in AND gate 44. The output of the AND gate 44 is a signal 46, the "CRT scan signal," that is true only during active scanning of the CRT.

The output of the zero crossing detector 28 is fed to a video pulse generator circuit 32. The output of circuit 32 is combined in the AND gate 48 with the signal 46, passing the CRT scan signal 46 to the video amplifier circuit 52 via the OR gate 50 whenever an output pulse is issued by the zero crossing detector 28 and the signal 46 is true. As will be apparent to those skilled in the art, the effect of such a video signal, controlling the CRT beam intensity, is to make a bright line on the CRT 14 that marks the vertical deflection axis and the electrical center of horizontal deflection.

Practical considerations dictate that one and only one horizontal line be drawn to mark the electrical center of vertical deflection. To achieve this result, the output signal from zero crossing detector 36 is combined with the CRT scan signal in AND gate 54 to set D flip-flop 56. The output of D flip-flop 56 is combined with signal 46 in AND gate 58 to toggle JK flip-flop 60 on the negative going edge of the signal 46. Since the JK flip-flop 60 is in the clear state due to the prior action of the output pulse from negative peak detector 38, the output of JK flip-flop 60 will become true when toggling takes place. The output of JK flip-flop 60 will remain in the true state until the signal 46 goes false, signalling the end of active scanning of the current line and toggling JK flip-flop 60. The change from true to false state of the signal from JK flip-flop 60 will cause one-shot multivibrator 62 to generate a short logic pulse to place D flip-flop 56 in the clear state until reset by the output from zero crossing detector 36 when the vertical scan current reaches zero in the subsequent display field. Signal 46 combined with the true state of JK flip-flop 60 in AND gate 64 will deliver an output pulse via OR gate 50 to brighten the one horizontal trace or line located at the electrical center of vertical deflection. The result will be a "crosshair" pattern displayed on the face of the CRT with the crossing at the electrical center of the tube and the "hairs" delineating the vertical and horizontal deflection axes.

The detectors 24, 26, 28, 36, 38 and 40 are circuits which are well known to those skilled in the art. For example, a positive peak detector circuit is described at pages 3-17 and 3-18 of "linear and Interface Circuits Applications," Volume 1, (Amplifiers, Comparators, Timers and Voltage Regulators), D. E. Pippenger and E. J. Tobaben, Texas Instruments Incorporated, 1985. A zero-crossing detector is described in the same text at pages 3-23 and 3-24.

An electronic CRT centering alignment method and apparatus has been disclosed. The invention reduces CRT projector setup and test time in both the factory and the field. It optimizes projector performance in respect to image distortion, non-linearity, defocussing and astigmatism by minimizing the asymetry of such aberrations in the CRT/optical system.

It is understood that the above-described embodiment is merely illustrative of the possible specific embodiments which may represent principles of the present invention. Other arrangements may readily be devised in accordance with these principles by those skilled in the art without departing from the scope of the invention.

What is claimed is:

1. Apparatus for indicating the deflection alignment of a raster-scanned CRT display, comprising:
   means responsive to the CRT display horizontal deflection signal for generating a horizontal zero pulse each time a zero crossing is detected during an active scan interval of the CRT display;
   means responsive to the CRT display vertical deflection signal for generating a vertical zero pulse each time a zero crossing is detected during an active scan interval of the CRT display;
   video signal generator responsive to said horizontal zero pulse for generating a first CRT beam control signal in response to said horizontal zero pulse, said first CRT control signal generating a vertical line on the CRT marking the vertical deflection axis and the electrical center of horizontal deflection, said generator further responsive to said vertical zero pulse for generating a second CRT beam control signal in response to said vertical zero pulse, said second CRT control signal generating a horizontal raster scanned line on the CRT marking the horizontal deflection axis and the electrical center of vertical deflection.

2. The apparatus of claim 1 wherein said means for generating a horizontal zero pulse comprises a zero crossing detector circuit responsive to said horizontal deflection signal for producing an output each time a zero crossing is detected, and a video pulse generator triggered by said detector circuit output to produce a pulse of a predetermined duration.

3. The apparatus of claim 1 wherein said means for generating a vertical zero pulse comprises a zero crossing detector circuit responsive to said vertical deflection signal for producing a true output each time a zero crossing is detected.

4. The apparatus of claim 1 further comprising means responsive to said horizontal and vertical deflection signals for generating a CRT scan active signal which is active only during active CRT scan intervals, and means for respectively gating said horizontal and vertical zero pulses with said CRT scan active signal.

5. The apparatus of claim 4 wherein said gating means comprises a first logical AND circuit which receives as inputs said horizontal zero pulse signal and said CRT scan active signal, and a second logical AND circuit which receives as inputs said vertical zero pulse signal and said CRT scan active signal.

6. The apparatus of claim 5 wherein said means for generating said CRT scan active signal comprises a means for generating a horizontal scan signal which is active only during the horizontal scan intervals of the CRT display, a means for generating a vertical scan signal which is active only during the vertical scan intervals of the CRT display, and a third logical AND circuit receiving said respective horizontal and vertical scan signals as inputs, the output of said third AND circuit defining said CRT scan active signal.

7. The apparatus of claim 6 wherein said means for generating a horizontal scan signal comprises a positive peak detector responsive to said horizontal deflection signal for generating a true positive peak signal when the positive peak of said horizontal deflection signal is detected, a negative peak detector for generating a true negative peak signal when a negative peak is detected, and a D flip-flop logic circuit which is set by said positive peak signal and cleared by said negative peak signal, the output of said flip-flop circuit comprising said horizontal scan active signal.

8. The apparatus of claim 6 wherein said means for generating a vertical scan active signal comprises a positive peak detector circuit responsive to said vertical deflection signal for generating a true positive peak signal when the positive peak of said vertical deflection signal is detected, a negative peak detector for generating a true negative peak signal when the negative peak is detected, and a D flip-flop circuit which is set by said positive peak signal and cleared by said negative peak signal, an output of said flip-flop circuit comprising said vertical scan active signal.

9. An electronic apparatus for indicating the deflection alignment of a raster-scanned cathode ray tube (CRT), characterized by horizontal and vertical sawtooth deflection signals respectively proportional to the respective currents in the horizontal and vertical deflection yokes, comprising:

means responsive to the horizontal deflection signal for generating a horizontal signal which is true only during the active horizontal scanning interval of the CRT;

means responsive to the vertical deflection signal for generating a vertical signal which is true only during the active vertical scanning interval;

means responsive to said horizontal and vertical signals for generating a CRT scan active signal that is true only during active scanning of the CRT;

horizontal zero crossing detector means responsive to said horizontal deflection signal for generating a video pulse whenever a zero crossing is detected of the horizontal detector signal;

means responsive to said video pulse and said CRT scan active signal for providing a CRT beam intensity control signal whenever a video pulse is generated and the CRT scan active signal is true, thereby marking the vertical deflection axis and the electrical center of horizontal deflection;

vertical zero crossing detector means responsive to said vertical deflection signal for generating a vertical zero crossing signal when a zero crossing is detected; and means responsive to said vertical zero crossing signal and said CRT scan active signal for generating a video signal for drawing a horizontal line to mark the electrical center of vertical deflection.

* * * * *